2,970,087

HYDROXYLATING 12a-DEOXYTETRACYCLINE WITH ASCOMYCETEAE

Donald Beck, Mystic, and Gilbert M. Shull, Old Lyme, Conn., assignors to Chas. Pfizer & Co., Inc., Brooklyn, N.Y., a corporation of Delaware No Drawing. Filed June 9, 1960, Ser. No. 34,886

7 Claims. (Cl. 195—80)

This application is concerned with a new method of preparing tetracycline antibiotics and more particularly with a new method of introducing a 12a-hydroxyl group into a 12a-deoxytetracycline by means of certain Ascomyceteae.

The 12a-deoxy derivatives of the tetracycline antibiotics are known compounds which may be prepared by a variety of methods, including reduction of the tetracyclines with zinc as described, for example, in Journal of the American Chemical Society, vol. 75, p. 5474 (1953); vol. 76, p. 3574 (1954); in U.S. Patent 2,922,817, issued to A. Greene on January 26, 1960; and in South African Patent 3651/58. Alternatively, 12a-deoxytetracyclines may be prepared by catalytic hydrogenation, in a substantially anhydrous inert solvent, of a 12a-(O-acyl) derivative of the tetracycline antibiotic wherein the acyl radical is that of a hydrocarbon carboxylic acid containing from 1 to 6 carbon atoms, or of the corresponding 12a-(O-arylcarbamyl) derivative of the appropriate tetracycline, as described in copending application Serial Number 813,654, filed May 18, 1959, and assigned to the same assignee as the present invention. 12a-deoxytetracyclines may also be synthesized by conventional methods from commonly available intermediates. In Journal of the American Chemical Society, vol. 82, p. 1250 (1960), there is reported a synthesis for dedimethylamino-6-demethyl-6,12a-dideoxy-7-chlortetracycline. Processes for 12a-hydroxylation of 12a-deoxytetracyclines are therefore of particular importance as part of an overall synthesis of the valuable tetracycline antibiotics.

Now a particularly effective microbiological method for accomplishing this transformation has been discovered which utilizes the oxygenating activity of certain microorganisms of the class Ascomyceteae. The species which are found to possess this activity to a remarkable degree are *Sporormia minima* and *Thielavia terricola*. A variety of strains of these organisms are known and publicly available as growing cultures. For example, *S. minima* NRRL 2475 is available from the culture collection of the Northern Regional Research Laboratory in Peoria, Illinois. *S. minima* cultures are also available from the Dominion Laboratory of Plant Pathology, Ste-Anne-de-la-Pocatiere, Quebec (Culture No. 345) and from Centraalbureau vor Schimmelcultures, Baarn, Holland. Publicly available *Thielavia terricola* cultures include ATCC 1722 and ATCC 11769, from the American Type Culture Collection in Washington, D.C.; QM 214 and QM 843, from the Quartermaster Culture Collection, Quartermaster General Laboratories, Philadelphia; and No. 2002, from the Japanese Type Culture Collection, Nagao Institute, Kitashinagawa, Tokyo. Cultures are also available from Centraalbureau por Schimmelcultures, Baarn, Holland; the New York Botanical Garden Laboratory Collection; and the Institute for Fermentation, Osaka. In addition, a culture of *T. terricola* has been deposited in the American Type Culture Collection in Washington, D.C., and assigned ATCC No. 13807. This culture was isolated from soil and identified by planting and testing cultures thereof on media normally used for the identification of such microorganisms and by observing the growth and/or changes which occur incident thereto. This culture will grow satisfactorily on many of the media used for Ascomycete propagation, including potato dextrose agar. The latter may be prepared by steaming 100 gms. peeled, sliced potatoes for 30 minutes in 500 ml. distilled water and diluting the resulting extract to 1 liter. After addition of 10 gms. dextrose and 20 gms. agar, these ingredients are dissolved in the steamer and the solution is transferred to tubes and sterilized for 20 minutes at 20 p.s.i.g. steam pressure. No pH adjustment is necessary Methods have previously been reported for 12a-hydroxylation of 12a-deoxytetracyclines by means of organisms entirely different from those herein described. In Journal of the American Chemical Society, vol. 81, p. 4750–1 (1959), there is described the use of *Curvularia lunata, C. pallescens,* and *Botrytis cinerea,* of the class Fungi Imperfecti. A great number of microorganisms have been tested for their effectiveness in 12a-hydroxylation of 12a-deoxytetracyclines. Most of these gave no indication of such 12a-hydroxylation. In contrast to the published methods and the poor results obtained with a variety of organisms studied by the inventors of the present process, the Ascomyceteae of the present invention have given strikingly favorable results, allowing the preparation of such products as tetracycline in high purity and in yields of over 30%.

The 12a-deoxytetracyclines conform to the formula

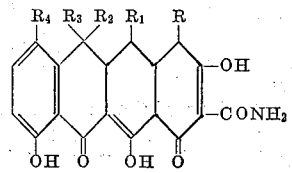

where R is H or dimethylamino $R^1$ is H or OH
$R^2$ is H or OH
$R^3$ is H or $CH_3$
$R^4$ is H, Cl or Br These include, for example 12a-deoxytetracycline
5-hydroxy-12a-deoxytetracycline
6-demethyl-12a-deoxytetracycline
6-deoxy-12a-deoxytetracycline
6-deoxy-6-demethyl-12a-deoxytetracycline
5-hydroxy-6,12a-dideoxytetracycline
4-desdimethylamino-12a-deoxytetracycline
4-desdimethylamino-6,12a-dideoxytetracycline
4-desdimethylamino-6-demethyl-12a-deoxytetracycline
4 - desdimethylamino - 6 - demethyl - 6,12a - dideoxytetracycline
4-desdimethylamino-5-hydroxy-12a-deoxytetracycline
4-desdimethylamino-5-hydroxy-6,12a-dideoxytetracycline
6-demethyl-7-chlor-12a-deoxytetracycline
6-demethyl-7-bromo-12a-deoxytetracycline
4-desdimethylamino-7-chlor-12a-deoxytetracycline In effecting 12a-hydroxylation according to the new process the 12a-deoxytetracycline may be added to a growing culture of the Ascomycete under submerged aerobic conditions, or it may be incorporated in the medium before inoculation. Alternatively, the culture may be propagated in an aqueous nutrient medium until substantial growth is attained and then filtered. 12a-hydroxylation may then be effected by adding the selected 12a-deoxytetracycline to the cell-free filtrate and allowing the hydroxylation to proceed under aerobic conditions.

A variety of aqueous media are suitable for microorganism propagation in the new process of this invention. A source of nitrogen, which may be organic or inorganic, should be supplied. Substances which are suitable nitrogen sources include soybean meal, corn steep liquor, enzymatic casein digests, and yeast nitrogen base, as well as ammonium salts, urea and the like. In addition, a carbohydrate source, such as a sugar, starch, or glycerol should be furnished. It is frequently beneficial to further provide other growth factors, such as those contained in yeast extract or distillers solubles. The mineral salt requirements of the organisms are ordinarily satisfied by the natural salt content of the other ingredients, as well as by the use of tap water, which already contains a variety of trace metals, in formulating the medium.

A wide range of pH conditions permit satisfactory growth of the Ascomyceteae employed by the new process. The initial pH of the medium will usually fall between about 4 and 8 and pH adjustment is generally unnecessary. After sterilization, suitably by heat, the medium may be cooled and inoculated from a slant culture of the selected organism. In the laboratory, Fernbach flasks, mechanically shaken to provide aeration and agitation, are suitable for propagation of the culture, while in the plant, standard fermentation vessels equipped for submerged aerobic fermentation may be employed. Temperatures between about 20 and 40° C., preferably 25–30° C., are satisfactory. During propagation the pH will usually be observed to drop to a value between about 2 and 4.5. The optimum fermentation time will vary with the organism, the temperature, and the other conditions selected, but periods of from about 24 to 72 hours usually give excellent results.

If the 12a-deoxytetracycline antibiotic was not incorporated in the medium before inoculation, it may now be added to the broth or, if desired, to the cell-free broth filtrate. The tetracycline may be added dry or dispersed in a suitable vehicle such as acetone or 70% aqueous ethanol. Concentrations of the tetracycline in the broth may vary over a wide range, but to more effectively utilize the capacity of the equipment it is preferred to introduce at least about 0.25 to 1 gram per liter. If the tetracycline is added as a dispersion in aqueous ethanol or similar organic liquid it is preferred to limit the quantity of such liquid introduced to about 3% w./v. or less of the total volume of the broth. After addition of the 12a-deoxytetracycline aeration is continued as before, preferably until substantially all of the substrate has been consumed. Periods between about 8 and 72 hours additional are usually adequate, and most commonly no more than 24 hours will be required.

The progress of the reaction is conveniently followed by paper chromatography. Whatman No. 4 paper, buffered with pH 3 MacIlvaine buffer and dried, is suitable, and may be employed with one of several solvent systems, e.g. ethyl acetate saturated with water, or the upper phase which results upon equilibration of 10 volumes ethyl acetate with 1 volume each of butanol and water. After development for about 1–15 hours the chromatogram is dried, neutralized with ammonia, and examined under ultraviolet light for fluorescent zones. The components are most accurately identified by simultaneous chromatography of authentic samples of substrate and anticipated product.

The 12a-hydroxylated products are readily recovered in purified form from the reaction mixtures by known procedures. For example, about 2 grams per liter of a calcium or magnesium salt, such as calcium chloride, may be added to the filtered fermentation broth and the pH adjusted to about 7.5–8. The activity may then be extracted into a substantially water-immiscible solvent such as butanol and the extract concentrated in vacuum to about one-tenth volume. Hexane is next added to the concentrate and the product extracted into dilute aqueous acid. Upon neutralization of the aqueous solution the product precipitates as the free base and may be crystallized from a suitable solvent mixture such as isopropyl alcohol acidified with dilute hydrochloric acid.

The new process furnishes a dependable means for 12a-hydroxylation in good yield and thereby provides a highly desirable link in the overall synthesis of the valuable tetracycline antibiotics. Products are recovered substantially free from unreacted starting material and purification is accordingly greatly simplified.

The following examples are provided by way of illustration and should not be interpreted as limiting the invention, many variations of which are possible without departing from the spirit or scope thereof. The invention embraces not only the specific microorganisms described but also mutants thereof as produced by various known means, such as X-radiation, ultraviolet radiation and the like.

Example I

| | G. |
|---|---|
| Glucose monohydrate | 30.0 |
| Yeast nitrogen base (Difco) | 6.7 |
| Yeast extract (Difco) | 5.0 |

Water to make 1 liter.

The above medium, which has a pH of about 5.7, is placed in a Fernbach flask provided with a cotton plug and sterilized by autoclaving for 30 minutes at 121° C. After cooling to 28° C. the medium is inoculated with spores of *Sporormia minima* NRRL 2475 rinsed from an agar slant with sterile water and the culture is agitated on a shaker for 24 hours at 28° C. At this time the pH has dropped to a value of about 3. A gram of 12a-deoxytetracycline suspended in 30 ml. of 70% aqueous 3A ethanol is now introduced and shaking is continued for 16 hours at 28° C., when a paper chromatogram reveals a strong tetracycline spot and complete consumption of the 12a-deoxytetracycline.

The fermentation mixture is filtered and 2 grams of calcium chloride is added to the filtrate. The pH is adjusted to 7.5–8 with sodium hydroxide and the solution extracted with two 500 ml. portions of butanol. The extracts are combined and concentrated at about 40° C. in vacuum to 100 ml. After addition of 200 ml. hexane the tetracycline is extracted with several 20 ml. portions of 0.1 N hydrochloric acid. Upon neutralization of the aqueous phase with sodium hydroxide, tetracycline base precipitates and is recovered in good yield. The solid product is found upon microbiological turbidimetric assay to have a potency of 500 γ/mg. It is further purified by crystallization from isopropyl alcohol adjusted to pH 2.5 with dilute hydrochloric acid. The identity of the tetracycline is confirmed by comparison with an authentic sample.

Example II

Employing the medium of Example I, *Thielavia terricola* ATCC 13807 is propagated in submerged aerobic growth for 36 hours and the broth is then filtered. To 100 ml. of the filtrate is added 25 mg. 12a-deoxytetracycline dispersed in 1 ml. 70% ethanol. Agitated aeration is resumed and samples are withdrawn periodically for analysis by paper chromatography. 8 hours after addition of substrate some tetracycline is detected, and after 24 hours the 12a-deoxytetracycline has been completely consumed. At this time the reaction is terminated and the product recovered and purified in good yield.

Example III

The procedure of Example I is repeated, but this time the 12a-deoxytetracycline is added to the medium before inoculation. Tetracycline is again recovered and purified in good yield.

Example IV

The procedure of Example I is successfully applied to 5-hydroxy-12a-deoxytetracycline, substituting a medium of the following composition:

| | G. |
|---|---|
| Soybean meal | 10.0 |
| Glucose monohydrate | 20.0 |
| Distillers solubles | 0.5 |

Water to make 1 liter.

*Example V*

The procedure of Example I is again successfully applied to 6-demethyl-12a-deoxytetracycline, substituting the following medium for the one previously employed:

| | G. |
|---|---|
| Urea | 1.5 |
| $(NH_4)HPO_4$ | 3.0 |
| Sucrose | 20.0 |
| Yeast extract | 5.0 |

Water to make 1 liter.

*Example VI*

12a-hydroxylation of the following tetracyclines is accomplished following the procedures of the previous examples:

4-desdimethylamino-12a-deoxytetracycline
6,12a-dideoxytetracycline
6-demethyl-6,12a-dideoxytetracycline
4-desdimethylamino-6,12a-dideoxytetracycline
4-desdimethylamino-6-demethyl-12a-deoxytetracycline
4-desdimethylamino-6-demethyl-6,12a-dideoxytetracycline
5-hydroxy-6,12a-dideoxytetracycline
4-desdimethylamino-5-hydroxy-12a-deoxytetracycline
4-desdimethylamino-5-hydroxy-6,12a-dideoxytetracycline
6-demethyl-7-chlor-12a-deoxytetracycline
4-desdimethylamino-7-chlor-12a-deoxytetracycline

What is claimed is:

1. A process for the 12a-hydroxylation of a 12a-deoxy derivative of a tetracycline antibiotic which comprises contacting said derivative with the oxygenating activity of an Ascomycete selected from the group consisting of *Sporormia minima* and *Thielavia terricola*.

2. A process as in claim 1 wherein said Ascomycete is *Sporormia minima* NRRL 2475.

3. A process as in claim 1 wherein said Ascomycete is *Thielavia terricola* ATCC 13807.

4. A process as in claim 1 wherein said derivative is subjected to the action of a growing culture of the microorganism under submerged aerobic conditions.

5. A process as in claim 1 wherein the microorganism is cultivated aerobically in a nutrient medium until substantial growth is obtained, the resulting broth is filtered, and said derivative is subjected to the action of said filtrate under aerobic conditions.

6. A process for the preparation of tetracycline which comprises cultivating an Ascomycete selected from the group consisting of *Sporormia minima* and *Thielavia terricola* under submerged aerobic conditions in an aqueous nutrient medium containing 12a-deoxytetracycline.

7. A process for the preparation of 5-hydroxytetracycline which comprises cultivating an Ascomycete selected from the group consisting of *Sporormia minima* and *Thielavia terricola* under submerged aerobic conditions in an aqueous nutrient medium containing 5-hydroxy-12a-deoxytetracycline.

No references cited.